(12) United States Patent
Kido

(10) Patent No.: US 7,203,531 B2
(45) Date of Patent: Apr. 10, 2007

(54) PORTABLE TERMINAL DEVICE TO CONTROL MESSAGES DISPLAYED ON THE DISPLAY, METHOD AND PROGRAM TO CONTROL DISPLAY OF THE MESSAGES

(75) Inventor: Toru Kido, Tokyo (JP)

(73) Assignee: NEC Corporation, Tokyo (JP)

(*) Notice: Subject to any disclaimer, the term of this patent is extended or adjusted under 35 U.S.C. 154(b) by 429 days.

(21) Appl. No.: 10/145,888

(22) Filed: May 16, 2002

(65) Prior Publication Data
US 2002/0177418 A1    Nov. 28, 2002

(30) Foreign Application Priority Data
May 24, 2001 (JP) ............................. 2001-154901

(51) Int. Cl.
*H04M 1/00* (2006.01)
*H04B 1/38* (2006.01)

(52) U.S. Cl. .................. 455/575.3; 455/575.1; 455/550.1; 455/566; 455/90.1; 455/90.3; 455/412.1

(58) Field of Classification Search .......... 455/550.1, 455/90.1–90.3, 575.1, 575.3, 566, 410, 411, 455/412.1, 412.2
See application file for complete search history.

(56) References Cited

U.S. PATENT DOCUMENTS 6,175,743 B1    1/2001  Alperovich et al.
6,438,392 B1 *  8/2002  Toba ......................... 455/567
6,792,293 B1 *  9/2004  Awan et al. ................. 455/566

FOREIGN PATENT DOCUMENTS

| DE | 198 40 667 A1 | 3/2000 |
|----|---------------|--------|
| EP | 0 678 987 A1  | 10/1995 |
| GB | 2 238 343 A   | 2/1999 |
| WO | WO 00/74349 A2 | 12/2000 |
| WO | WO 01/28193 A1 | 4/2001 |

* cited by examiner

*Primary Examiner*—Matthew D. Anderson
*Assistant Examiner*—Eugene Yun
(74) *Attorney, Agent, or Firm*—Sughrue Mion, PLLC (57) ABSTRACT

If data received by a portable terminal device having a folding structure in accordance with the present invention is designated information the user wants to check, the received data is displayed on the display device located at a position making the display device visible to the user even with the folding terminal closed. Specifically, the data in the first predetermined division of the received data is compared with the designated information entered in advance by the user. When the result of comparison signifies agreement, the received data is the information the user wants to check. Therefore, the data in the second predetermined division of the received data is then displayed on the display device.

70 Claims, 7 Drawing Sheets

| | |
|---|---|
| TITLE DESIGNATION AREA 1 | METEOROLOGICAL INFORMATION |
| ORIGINATOR DESIGNATION AREA 1 | WEATHER SERVICE |
| TITLE DESIGNATION AREA 2 | STOCK PRICE INFORMATION |
| ORIGINATOR DESIGNATION AREA 2 | UNDESIGNATED |
| TITLE DESIGNATION AREA 3 | UNDESIGNATED |
| ORIGINATOR DESIGNATION AREA 3 | UNDESIGNATED |
| ⋮ | ⋮ |
| TITLE DESIGNATION AREA N | UNDESIGNATED |
| ORIGINATOR DESIGNATION AREA N | UNDESIGNATED |

| TITLE DESIGNATION AREA 1 | WEATHER INFORMATION |
|---|---|
| TITLE DESIGNATION AREA 2 | UNDESIGNATED |
| TITLE DESIGNATION AREA 3 | UNDESIGNATED |
| ⋮ | ⋮ |
| TITLE DESIGNATION AREA N | UNDESIGNATED |

PORTABLE TERMINAL DEVICE TO CONTROL MESSAGES DISPLAYED ON THE DISPLAY, METHOD AND PROGRAM TO CONTROL DISPLAY OF THE MESSAGES

BACKGROUND OF THE INVENTION

1. Field of the Invention

The present invention relates to a portable terminal device, and a displaying method for the portable terminal device. More particularly, the present invention relates to a wireless portable terminal device having a folding structure that permits a first housing and a second housing to turn on a hinge, and a displaying method and a program for the wireless portable terminal device.

2. Description of the Related Art

In recent years, portable telephone terminals and wireless portable terminals have had a mail message transmitting/receiving feature and a browser. In order to make the most of the features, more and more terminals have rapidly come to include a large-color screen display device. A folding terminal has become a mainstream of terminals having a large-screen display device mounted therein.

Figures 1A, 1B:
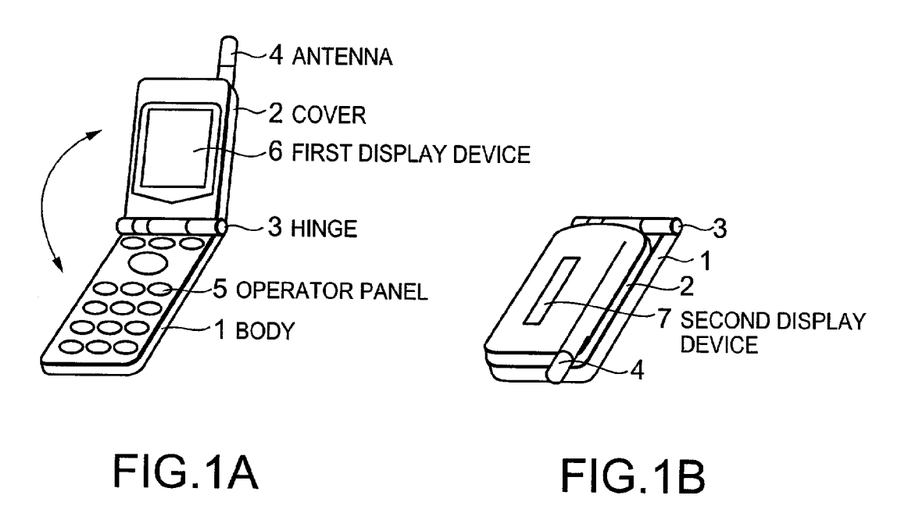
FIG. 1A shows the appearance with the folding terminal device left open.
FIG. 1B shows the appearance with the folding terminal device closed.

FIGS. 1A and 1B show the appearance of a wireless portable terminal having a folding structure. FIG. 1A shows the appearance with the folding terminal left open, FIG. 1B shows the appearance with the folding terminal closed. Referring to FIG. 1A, the folding wireless portable terminal has the folding structure permitting a body 1 that is a first housing and a cover 2 that is a second housing to turn on a hinge 3. With the hinge 3 as an axis, the terminal can be folded or unfolded in directions of arrows in FIG. 1A. An antenna 4 transmits or receives a radio wave. The body 1 includes an operator panel 5 that is an input means which the user of the terminal maneuvers. The cover 2 includes a first display device 6 that is a main display means of the terminal.

When the folding wireless portable terminal is folded, the display device 6 is opposed to the body 1 and located internally of the terminal. The user of the terminal cannot therefore check the contents of a presentation displayed on the display screen of the display device 6. A terminal having a second display device mounted on the outer surface of the folded terminal has made its debut so as to help the user of the terminal check necessary minimal information with the terminal folded.

Referring to FIG. 1B, the folding wireless portable terminal has a second display device 7 mounted as an auxiliary display means on a surface opposite to the surface of the cover 2 on which the first display device 6 is mounted. With the folding terminal closed, the second display device 7 has the ability to help the user check necessary minimal information alone. Moreover, with the folding terminal left open, the presenting action of the second display device 7 is generally disabled for the reason that the user has difficulty in checking the contents of a presentation displayed on the second display device 7 or for the purpose of extending the service life of a battery even slightly.

The necessary minimal information to be displayed on the second display device 7 includes a remaining battery capacity, a presentation of whether the present place is inside or outside a communication-enabled zone, and a mail message termination presentation "New Mail Terminated" signifying that a mail message has been terminated. If the terminal is a portable telephone terminal, a voice termination presentation "Call Terminated" indicating that voice has been terminated is also included.

However, when the wireless portable terminal having the folding structure has received a mail message, if "New Mail Terminated" is displayed on the second display device 7, the user cannot find the contents of the received mail message. In order to check the contents of the newly received mail message, the user has to perform a maneuver of opening the terminal, and a maneuver of designating the received mail message to thus display the contents of the mail message on the first display device 6. This is labor-intensive. There is a possibility that the contents of the mail message read by performing the maneuvers may not be the contents of the mail message the user wants to check immediately.

SUMMARY OF THE INVENTION

The present invention is devised in view of the above-described problems. An aspect of the present invention is to provide a portable terminal device, and a displaying method and a program for the terminal device which enables the user to check the contents of received data, which the user wants to read, without the necessity of performing a special maneuver with the terminal closed.

A portable terminal device of the present invention comprises a first housing and a second housing connected with a hinge to each other. The terminal device of the present invention comprises a storing means that store a first information set, a receiving means that receives data including a second information set, a displaying means that displays a received message included in the data, a detecting means that detects whether the portable terminal device is closed, a comparing means that compares the first information set with the second information set and controlling means that controls whether the received message is displayed on the displaying means on the basis of the results of the detecting means and the comparing means. The displaying means is provided at a position visible to the user with the portable terminal device closed. And then, the controlling means controls the displaying means in order to display the received message when the portable terminal device is closed. The controlling means preferably controls the displaying means in order to display the received message when the first information set matches the second information set. On the other hand, the controlling means controls the displaying means in order to display additional information showing the arrival of the data when the first information set does not match the second information set. The second information set is at least one of title and sender name of the data.

And, a portable terminal device of the present invention comprises a storing means that stores a first information set and a second information set, a receiving means that receives data including title information, sender information and message information, a first displaying means provided at a position invisible to the user with the portable terminal device closed, a second displaying means provided at a position visible to the user with the portable terminal device closed, a detecting means that detects whether the portable terminal device is closed, first comparing means that compares the first information set with the title information, a second comparing means that compares the second information set with the sender information and a controlling means for the second displaying means on the basis of the results of the detecting means and at least one of the first comparing means and second comparing means. The second display means preferably displays the message information with the portable terminal device closed. The second display means displays the message information when the first information set matches the title information, and a message showing the arrival of the data when the first information set does not match the title information. On the other hand, the second display means displays the message information when the second information set matches the sender information, and a message showing the arrival of the data when the second information set does not match the sender information. The data may be an electronic mail message.

Moreover, a portable terminal device of the present invention comprises a storing means that stores a first information set, a counting means that counts for a predetermined time, an outputting means that outputs a signal when the counting means counts up the predetermined time, a connecting means that connects to a predetermined server in response to the signal, a receiving means that receives data including a second information set from the predetermined server, a displaying means that displays a received message included in the data, a detecting means that detects whether the portable terminal device is closed, a comparing means that compares the first information set with the second information set and controlling means for controlling whether the second information set is displayed on the displaying means on the basis of the results of the detecting means and the comparing means. The displaying means is preferably provided at a position visible to the user with the portable terminal device closed. The controlling means controls the displaying means to display the received message when the portable terminal device is closed. And then, the controlling means controls the displaying means in order to display the received message when the first information set matches the second information set. On the other hand, the controlling means controls the displaying means to display additional information showing the arrival of the data when the first information set does not match the second information set. The second information set is title name of the data. The data may be an HTML file, and the predetermined server may be an information distribution server.

And, a portable terminal device of the present invention comprises a memory that stores a first information set, a receiver that receives data including a second information set, a display that displays received message included in the data, a detector that detects whether the portable terminal device is closed, a comparator that compares the first information set with the second information set and a controller that controls whether the received message is displayed on the display on the basis of the results of the detector and the comparator. The display may be provided at a position visible to the user with the portable terminal device closed. The controller controls the display in order to display the received message when the portable terminal device is closed. The controller controls the display in order to display the received message when the first information set matches the second information set. On the other hand, the controller controls the display in order to display additional information showing the arrival of the data when the first information set does not match the second information set. The second information set may be at least one of title and sender name of the data.

Further, a portable terminal device of the present invention comprises a memory that stores a first information set and a second information set, a receiver that receives data including title information, sender information and message information, a first display provided at a position invisible to the user with the portable terminal device closed, a second display provided at a position visible to the user with the portable terminal device closed, a detector that detects whether the portable terminal device is closed, a first comparator that compares the first information set with the title information, a second comparator that compares the second information set with the sender information and a controller that controls the second display on the basis of the results of the detector and at least one of the first comparator and second comparator. The second display displays the message information with the portable terminal device closed. The second display displays the message information when the first information set matches the title information, and a message showing the arrival of the data when the first information set does not match the title information. On the other hand, the second display displays the message information when the second information set matches the sender information, and a message showing the arrival of the data when the second information set does not match the sender information. The data may be an electronic mail message.

And then, a portable terminal device of the present invention comprises a memory that stores a first information set, a timer that counts to a predetermined time, an outputting circuit that outputs a signal when the timer counts up to the predetermined time, a connector that connects to a predetermined server in response to the signal, a receiver that receives data including a second information set from the predetermined server, a display that displays received message included in the data, a detector that detects whether the portable terminal device is closed, a comparator that compares the first information set with the second information set and a controller that controls whether the second information set is displayed on the display on the basis of the results of the detector and the comparator. The display is provided at a position visible to the user with the portable terminal device closed. The controller controls the display to display the received message when the portable terminal device is closed. The controller controls the display to display the received message when the first information set matches the second information set. On the other hand, the controller controls the display to display additional information showing the arrival of the data when the first information set does not match the second information set. The second information set is title name of the data, the data may be an HTML file, and the predetermined server may be an information distribution server.

A method for controlling display of messages in a folding portable terminal device of the present invention comprises storing a first information set, receiving data including a second information set, detecting whether the terminal device is closed, comparing the first information set with the second information set, displaying received message, included in the data, on first display provided at a position visible to the user with the terminal device closed, both if the terminal device is closed and if the first information set matches the second information set. The method further comprises displaying additional information showing the arrival of the data on second display provided at a position invisible to the user with the terminal device closed, if the terminal device is opened. The second information set is at least one of title and sender name of the data. The data may be an electronic mail message.

Moreover, a method for controlling display of messages in a folding portable terminal device of the present invention comprises storing a first information set, counting a predetermined time, outputting a signal when the predetermined time is counted up, connecting a predetermined server in response to the signal, receiving data including a second information set from the predetermined server, detecting whether the terminal device is closed, comparing the first information set with the second information set and displaying received message included in the data on first display provided at a position visible to the user with the terminal device closed, both if the terminal device is closed and if the first information set matches the second information set. The method further comprises displaying additional information showing the arrival of the data on second display provided at a position invisible to the user with the terminal device closed, if the terminal device is opened. The second information set is title name of the data. The data may be an HTML file, and the predetermined server may be an information distribution.

A program for instructing a computer to implement a displaying method for a folding portable terminal device of the present invention comprises storing a first information set, receiving data including a second information set, detecting whether the terminal device is closed, comparing the first information set with the second information set, displaying received message, included in the data, on first display provided at a position visible to the user with the terminal device closed, both if the terminal device is closed and if the first information set matches the second information set.

Further, a program for instructing a computer to implement a displaying method for a folding portable terminal device of the present invention comprises storing a first information set, counting a predetermined time, outputting a signal when the predetermined time is counted up, connecting a predetermined server in response to the signal, receiving data including a second information set from the predetermined server, detecting whether the terminal device is closed, comparing the first information set with the second information set and displaying received message included in the data on first display provided at a position visible to the user with the terminal device closed, both if the terminal device is closed and if the first information set matches the second information set.

According to the present invention, therefore, the user can check the contents of received data he/she wants to read with the terminal device closed without the necessity of performing a special maneuver. This is because as long as data received by the portable terminal device having the folding structure is information (designated information) the user wants to check, the received data is displayed on the display device located at a position making the display device visible to the user even with the folding terminal device closed. According to the present invention, moreover, the shortening of the service life of a battery loaded in the terminal device can be minimized. This is because only when received data is information the user wants to check, the received data is displayed on the display device. In other words, every time the terminal device receives data, the received data is screened so that only information the user desires can be displayed on the display device. Compared with when all received data items are displayed but not screened, the power consumption required for the displaying can be suppressed.

BRIEF DESCRIPTION OF THE DRAWINGS

These and other aspects, features and advantages of the invention will become more fully apparent from the following detailed description taken in conjunction with accompanying drawings. In the drawings.

DETAILED DESCRIPTION OF THE PREFERRED EMBODIMENT

Hereinafter, each embodiment of the present invention will be described in detail with reference to the drawings.

Figure 2:
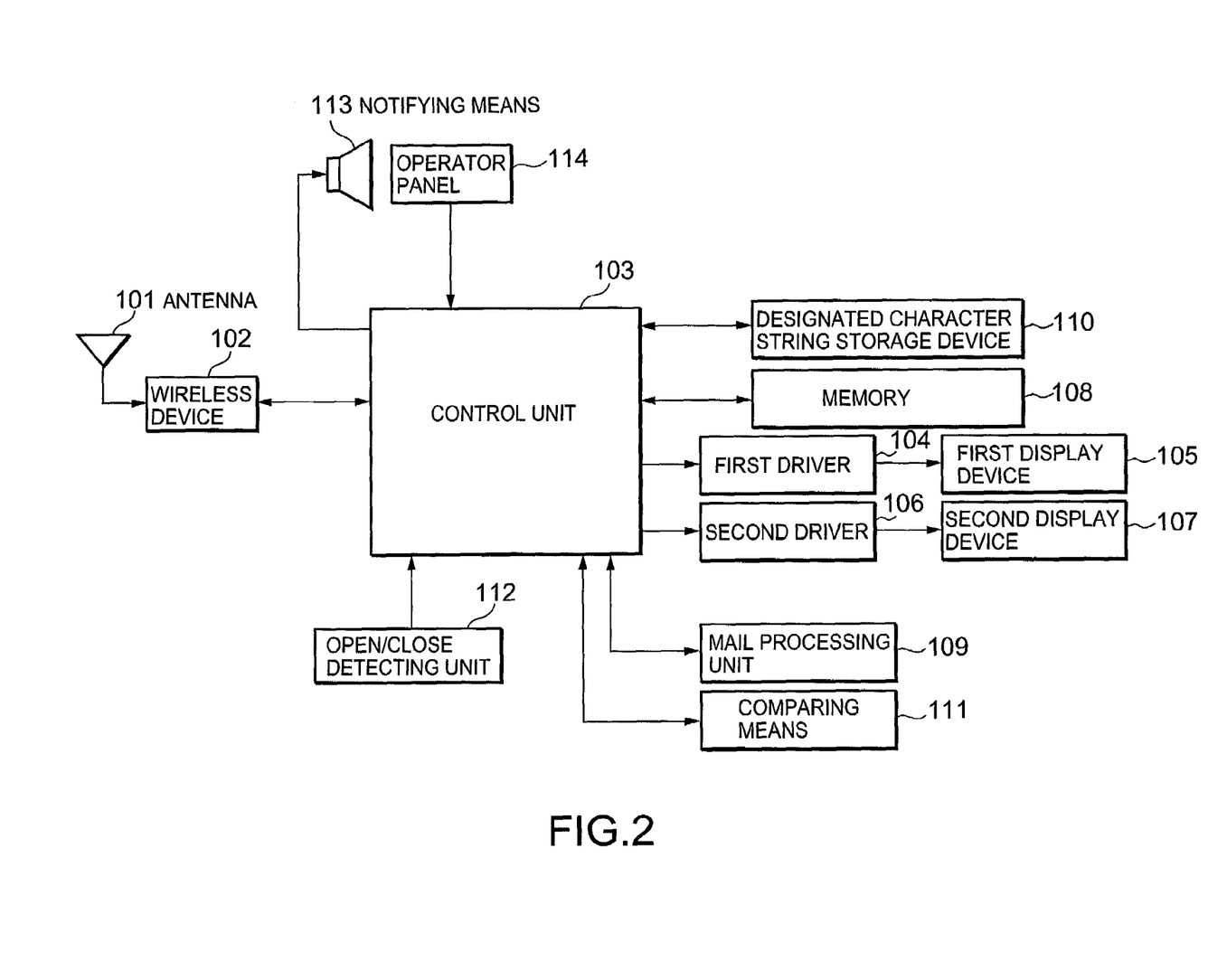
FIG. 2 is a block diagram showing the configuration of a portable terminal device in accordance with the first embodiment of the present invention.

FIG. 2 is a block diagram showing the configuration of a portable terminal device in accordance with the first embodiment of the present invention. Incidentally, the appearance of the portable terminal device in accordance with the first embodiment of the present invention is shown in FIG. 1A and FIG. 1B, and has already been described. The reiteration of the appearance will be omitted.

Referring to FIG. 2, the portable terminal device having a folding structure in accordance with the first embodiment of the present invention includes an antenna 101, a wireless device 102, a control unit 103, a first driver 104, a first display device 105, a second driver 106, a second display device 107, a memory 108, a mail processing unit 109, a designated character string storage device 110, a comparing means 111, an open/close detecting unit 112, a notifying means 113, and an operator panel 114.

The antenna 101 transmits or receives a radio wave and is comparable to the antenna 4 shown in FIG. 1A and FIG. 1B. The wireless device 102 modulates transmission data or demodulates received data. The wireless device 102 amplifies and demodulates data the antenna 101 has received over a wireless network, and transfers the resultant data as demodulated signal to the control unit 103. Moreover, the wireless device 102 modulates data sent from the control unit 103 as transmission data, and transfers the transmission data to the antenna 101.

When a mail message is received (terminated), the control unit 103 cuts out mail data from a digital signal that results from demodulation performed by the wireless device 102, and stores the mail data in the memory 108. The sampled mail data contains a mail header and a mail text defined by, for example, the Request for Comments (RFC) 822.

Moreover, the control unit 103 controls the presentations of the first display device 105 and second display device 107 via the first driver 104 and second driver 106. Furthermore, when a mail message is terminated, the control unit 103 controls the notifying means 113 to notify the user of the terminal of the fact that a mail message has been received. The notifying means 113 is realized with a vibrator, a light-emitting diode (LED), or a loudspeaker.

The operator panel 114 is an input means the user uses to determine various settings for the terminal. The control unit 103 processes a signal entered by maneuvering the operator panel 114 and then detected. Incidentally, the operator panel 114 is comparable to the operator panel 5 shown in FIG. 1A.

The first display device 105 serves as a main display means of the terminal, and is realized with, for example, a color liquid crystal display. Incidentally, the first display device 105 is comparable to the first display device 6 shown in FIG. 1A. With the folding terminal closed, the first display device 105 is opposed to the first housing (body 1) and located internally of the terminal. The user cannot therefore watch the first display device 105.

The second display device 107 serves as an auxiliary display means for the terminal, and is realized with, for example, a black-and-white liquid crystal display. Incidentally, the second display device 107 is comparable to the second display device 7 shown in FIG. 1B. The second display device 107 is mounted on the surface of the second housing (cover 2) opposite to the surface on which the first display device 105 is mounted. Therefore, the user can watch the second display device 107 with the folding terminal closed.

The second display device 107 presents information when the terminal is detected to be closed at the open/close detecting unit 112. With the terminal left open, the second display device 107 is controlled to have the presentation thereof disabled for the reason that the user has difficulty in discerning the contents of a presentation or for the purpose of extending the service life of a battery.

The memory 108 is a memory means in which a received mail message is stored. The mail processing unit 109 analyzes header information of newly received mail data that is cut out by the control unit 103. The mail processing unit 109 then cuts out a character string representing the title of a received mail message specified in the header information and a character string representing the originator (mail address) of the received mail message. Incidentally, the character string representing the title of the received mail message and the character string representing the originator thereof constitute the data in the first predetermined division of the received data.

The designated character string storage device 110 is a holding means that holds a first character string representing the title of a received mail message and a second character string representing the originator of the received mail message. The user enters the first and second character strings in advance by maneuvering the operator panel 114. Namely, the first and second character strings are used to judge whether a received mail message is information the user wants to check.

The comparing means 111 compares the character string representing the title of the received mail message, which is sampled by the mail processing unit 109, with the first character string stored in the designated character string storage device 110. The result of the comparison, whether the character strings agree or disagree with each other, is transferred to the control unit 103. Moreover, the comparing means 111 compares the character string representing the originator of the received mail message, which is sampled by the mail processing unit 109, with the second character string stored in the designated character string storage device 110. The result of the comparison, whether the character strings agree or disagree with each other, is transferred to the control unit 103.

The open/close detecting unit 112 detects whether the folding terminal is closed or open, and transfers the result of the detection to the control unit 103.

Figure 3:
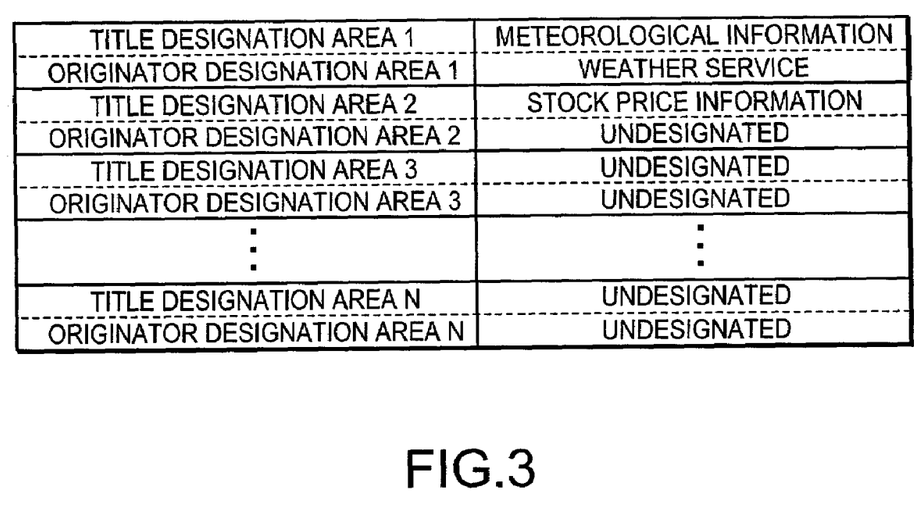
FIG. 3 shows an example of the structure of a designated character string storage device 110 shown in FIG. 2.

FIG. 3 shows an example of the structure of the designated character string storage device 110 shown in FIG. 2. Referring to FIG. 3, the designated character string storage device 110 has N (where N denotes a positive integer) pairs of a title designation area and an originator designation area. Data to be recorded in the title designation area is the first character string which the user enters in advance by maneuvering the operator panel 114. Moreover, data to be recorded in the originator designation area is the second character string the user enters in advance by maneuvering the operator panel 114.

Up to N pairs of character strings can be recorded in the N pairs of the title designation area and originator designation area in the designated character string storage device 110. Assume that whether the contents of a received mail message is displayed on the second display device 107 is judged by comparing only a character string representing the title of a received mail message with a stored one. In this case, the first character string alone is recorded in the title designation area, and data indicating the absence of a character string is recorded in the originator designation area paired with the title designation area. An example of this pair is provided as the pair of the title designation area 2 and originator designation area 2 shown in FIG. 3.

Similarly, when only a character string representing the originator of a received mail message is compared with a stored one, the second character string is recorded in the originator designation area, and data indicating the absence of a character string is recorded in the title designation area paired with the originator designation area. Using the operator panel 114, the user enters a character string equivalent to the character string representing the title of a mail message whose contents the user wants to be displayed on the second display device 107. The user also enters a character string equivalent to the character string representing the originator of the mail message. The entered character strings are then processed by the control unit 103 and stored in the designated character string storage device 110.

Figure 4:
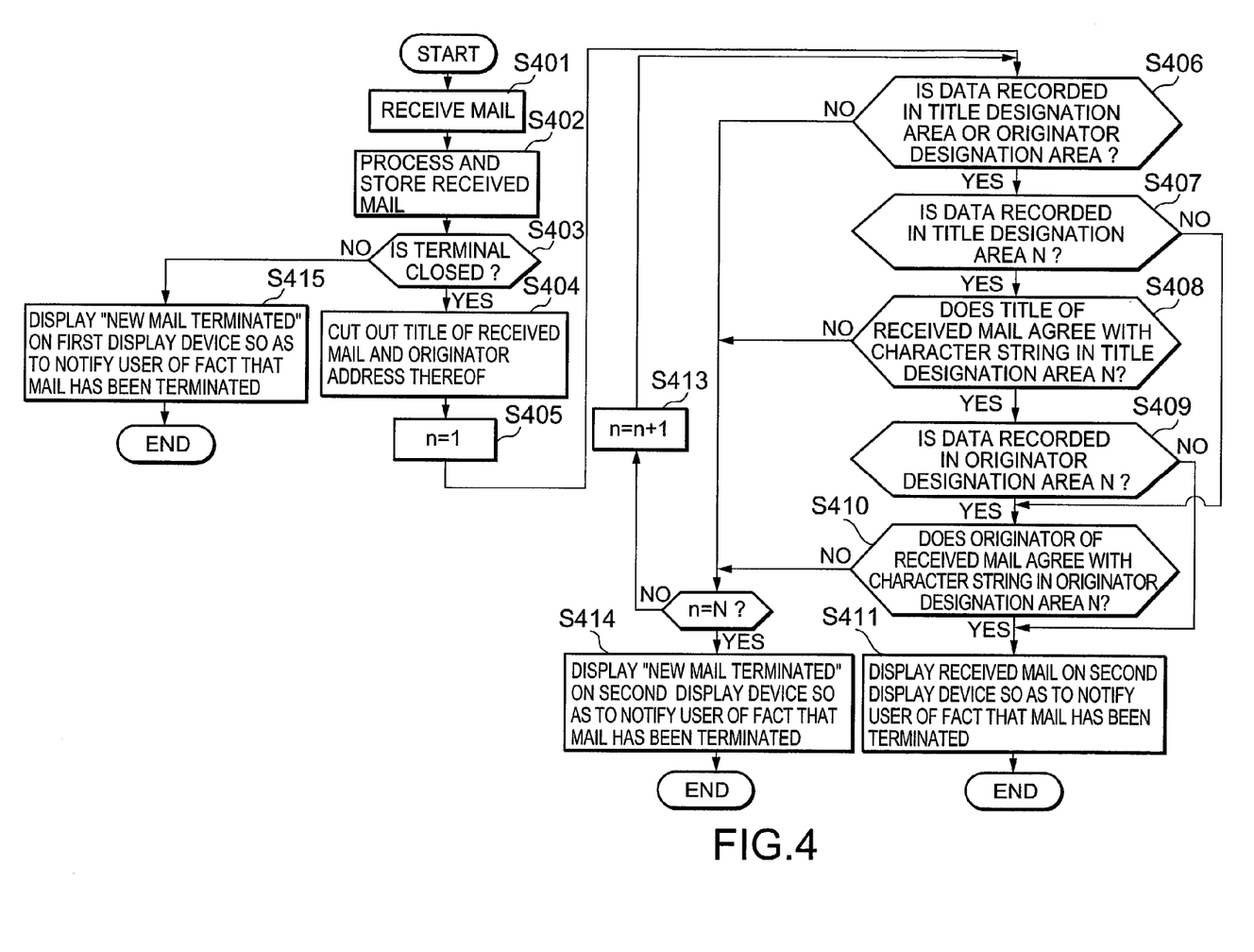
FIG. 4 is a flowchart describing actions to be performed when the portable terminal device shown in FIG. 2 has received a mail message.

Next, the actions of the portable terminal device in accordance with the first embodiment of the present invention will be described in conjunction with the drawings. FIG. 4 is a flowchart describing actions to be performed when the portable terminal device shown in FIG. 2 has received a mail message.

Referring to FIG. 4, the portable terminal device in accordance with the first embodiment of the present invention receives a mail message (S401). The control unit 103 cuts out mail data and stores the newly received mail in the memory 108 (S402). Thereafter, the control unit 103 judges from the result of detection provided by the open/close detecting unit 112 whether the terminal device is closed or open (S403).

If the terminal device is closed (the judgment of S403 is made in the affirmative), the mail processing unit 109 analyzes the header information of the received mail message sent from the control unit 103. The mail processing unit 109 then cuts out the title of the received mail message and the originator's address thereof, and transfers the character strings to the control unit 103 (S404). The control unit 103 initializes a parameter n to 1 so as to count the number of times by repetitive processing is performed (S405). Thereafter, the control unit 103 judges whether a character string is recorded in the title designation area 1 or originator designation area 1 in the designated character string storage device 110 (S406).

If a character string is recorded in the title designation area 1 or originator designation area 1 (the judgment of S406 is made in the affirmative), it is judged whether a character string is recorded in the title designation area 1 (S407). If a character string is recorded in the title designation area 1 (the judgment of S407 is made in the affirmative), the character string representing the title of the received mail message is compared with the recorded character string (S408). If the character string representing the title of the received mail message agrees with the first character string in the title designation area 1 (the judgment of S408 is made in the affirmative), it is judged whether a character string is recorded in the originator designation area 1 (S409).

If a character string is recorded in the originator designation area 1 (the judgment of S409 is made in the affirmative), the character string representing the originator of the received mail message is compared with the second character string in the originator designation area 1 (S410). If the character string representing the originator of the received mail message agrees with the second character string in the originator designation area (the judgment of S410 is made in the affirmative), it is judged that both the title and originator's address of the received mail message agree with the stored ones. The contents of the received mail message are displayed on the second display device 107. Moreover, the notifying means 113 notifies the user of the fact that the mail message has been terminated (S411).

The contents of a received mail message to be displayed on the second display device 107 are represented by the data in the second predetermined division of the received mail message. The data in the second predetermined division of the received mail message is, for example, data containing at least the text of the received mail message. Otherwise, the data in the second predetermined division of the received mail message may be data containing not only the text of the received mail message but also the character string representing the title thereof, the character string representing the originator thereof, and the reception time thereof.

Although the contents of a received mail message are displayed on the second display device 107 at S411, the ability of the second display device 107 to present information may be limited in terms of the number of characters. In this case, the contents of a received mail message may be displayed while being automatically scrolled laterally or automatically scrolled page by page under the control of the control unit 103.

If it is judged at S407 that the first character string is not recorded in the title designation area 1 (the judgment of S407 is made in the negative), control is passed to S410. If it is judged at S410 that the character string representing the originator of the received mail message agrees with the second character string in the originator designation area 1 (the judgment of S410 is made in the affirmative), the contents of the received mail message are displayed on the second display device 107 as mentioned above. Moreover, the notifying means 113 notifies the user of the fact that the mail message has been terminated (S411).

Moreover, after it is judged at S408 that the character string representing the title of the received mail message agrees with the first character string in the title designation area 1 (the judgment of S408 is made in the affirmative), if it is judged at S409 that no data is recorded in the originator designation area 1 (the judgment of S409 is made in the negative), control is passed to S411.

In short, in the portable terminal device according to the first embodiment of the present invention, if one of the first character string and second character string is recorded in the pair of a title designation area and an originator designation area, it is judged whether a character string that is contained in the data in the first predetermined division of a received mail message and that should be compared with one of the first and second character strings agrees with the one of the first and second character strings. Namely, if the one of the first and second character strings is the first character string, the character string representing the title of the received mail message is the character string that should be compared with the one of the first and second character strings. In contrast, if the one of the first and second character strings is the second character string, the character string representing the originator of the received mail message is the character string that should be compared with the one of the first and second character strings. If the character strings agree with each other, the contents of the received mail message are displayed on the second display device 107.

If it is judged at S406 that a character string is recorded in neither the title designation area 1 nor the originator designation area 1 (the judgment of S406 is made in the negative), or if it is judged at S408 or S410 that the result of comparison signifies disagreement, it is judged whether n=N (where N denotes the number of pairs of character strings that can be stored in the designated character string storage device 110) is met (S412). If n=N is not met (the judgement of S412 is made in the negative), n is incremented by one, or n is updated to n+1 (S413). Control is then passed to the sequence of S406 to S410. In other words, the sequence of S406 to S410 is performed sequentially on the N pairs of character strings stored in the designated character string storage device 110 until the judgement of S409 is made in the negative or the judgment of S410 is made in the affirmative.

If it is judged at S412 that n=N is met (the judgement of S412 is made in the affirmative), it is judged that the title or originator of a received mail message disagrees with the data stored in the designated character string storage device 110. In this case, the contents of the received mail message are not displayed on the second display device 107. Instead, "New Mail Terminated" signifying that a mail message has been received is displayed and the fact that a mail message has been terminated is notified (S414).

If it is judged at S403 that the terminal is left open (the judgment of S403 is made in the negative), "New Mail Terminated" is displayed on the first display device 105. The notifying means 113 notifies the user of the fact that the mail message has been received (S415). At this time, nothing is displayed on the second display device 107.

As mentioned above, in the portable terminal device according to the first embodiment of the present invention, the character string representing the title of a received mail message and the character string representing the originator thereof are compared with the first character string and second character string that are entered in advance by the user. If the character strings agree with the first and second character strings respectively, the contents of the received mail message are displayed on the second display device 107. Consequently, the user can effectively check information he/she wants to check with the terminal device closed without the necessity of performing any special maneuver.

According to the first embodiment of the present invention, the portable terminal device selects information, which the user wants to read, and displays it. Compared with when the contents of all mail messages received are displayed, power consumption required for the displaying can be suppressed. Eventually, the shortening of the service life of a battery can be minimized.

Figure 5:
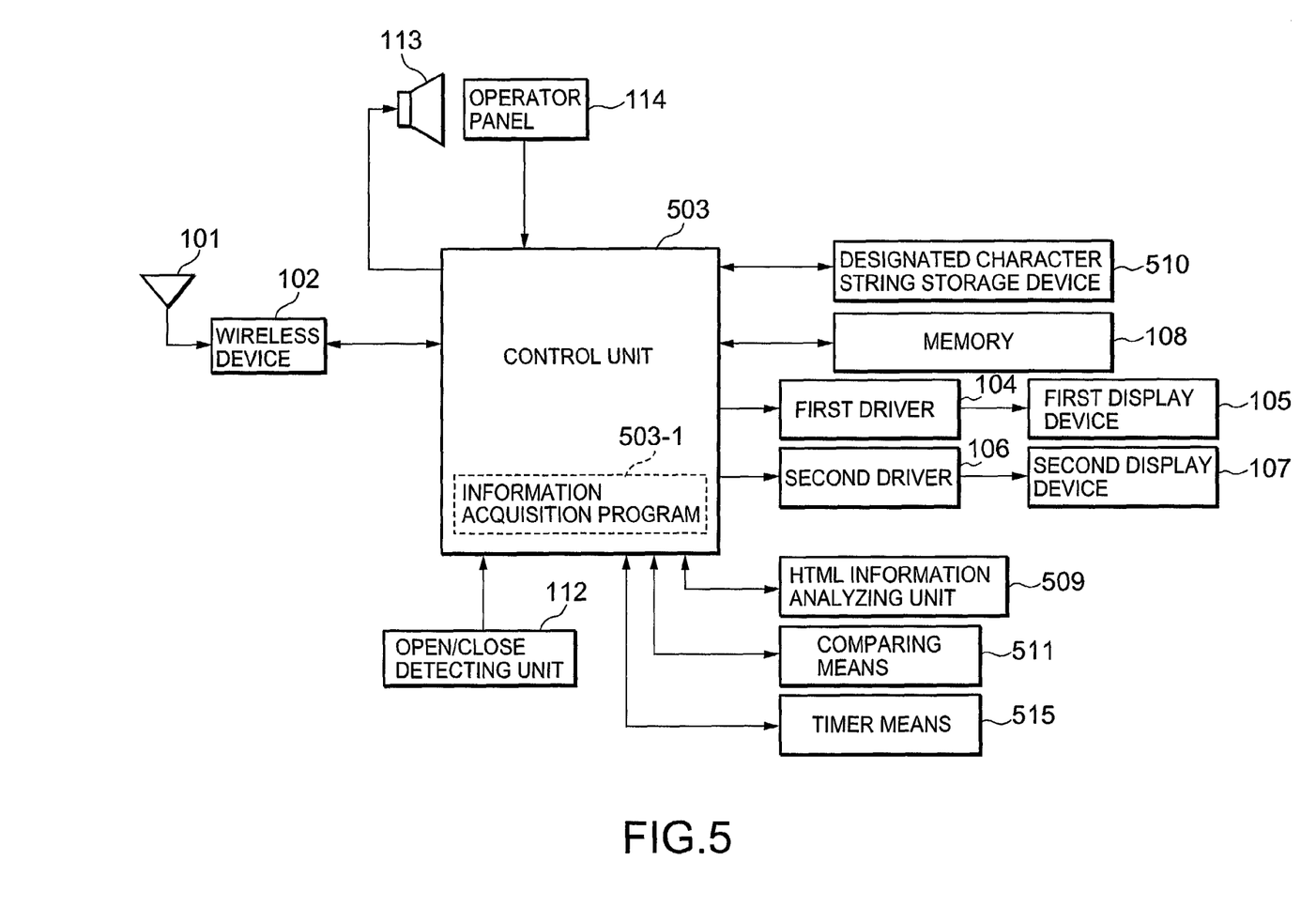
FIG. 5 is a block diagram showing the configuration of a portable terminal device in accordance with the second embodiment of the present invention.

Next, a portable terminal device in accordance with the second embodiment of the present invention will be described in conjunction with the drawings. FIG. 5 is a block diagram showing the configuration of the portable terminal device in accordance with the second embodiment of the present invention. The same reference numerals are assigned to components identical to those shown in FIG. 2. Incidentally, the portable terminal device in accordance with the second embodiment of the present invention has the appearance shown in FIG. 1A and FIG. 1B. Since the appearance has already been described, reiteration is omitted.

In the portable terminal device according to the first embodiment of the present invention, a received mail message designated or selected using the title of the received mail message and the originator's address thereof is displayed on the second display device 107. In contrast, in the portable terminal device according to the second embodiment of the present invention, a character string enclosed with tags TITLE and /TITLE (hereinafter generically title tags) contained in data created based on the Hypertext Markup Language (HTML) received by the terminal device is checked in order to judge whether a character string, which is enclosed with tags BODY and /BODY (hereinafter generically body tags) and contained in the HTML data, should be displayed as the contents of the HTML data on the second display means.

Referring to FIG. 5, the portable terminal device having a folding structure in accordance with the second embodiment of the present invention includes an antenna 101, a wireless device 102, a control unit 503, a first driver 104, a first display device 105, a second driver 106, a second display device 107, a memory 108, an HTML information analyzing unit 509, a designated character string storage device 510, a comparing means 511, an open/close detecting unit 112, a notifying means 113, an operator panel 114, and a timer means 515.

The control unit 503 has an information acquisition program 503-1. The control unit 503 runs the information acquisition program 503-1 to download an HTML file over a wireless network, and stores the film in the memory 108. Moreover, the control unit 503 controls the presentations of the first display device 105 and second display device 107 using the first driver 104 and second driver 106. Furthermore, when the control unit 503 acquires an HTML file, the control unit 503 controls the notifying means 113 to notify the user of the terminal of the fact that acquisition of the HTML file is completed.

According to the information acquisition program 503-1, an HTML file stored in a predetermined information distribution server is downloaded. Specifically, every time the timer means 515 gives a notification, the terminal is connected to the information distribution server, which provides an information distribution service for the terminal, over a wireless network in order to download an HTML file from the information distribution server. The information distribution server is located with a Uniform Resource Locator (URL) written in advance in the program.

At regular intervals of a time specified in the information acquisition program 503-1 of the control unit 503, the timer means 515 notifies the control unit 503 of the fact that the timer means has counted up a time. A character string the user has entered by maneuvering the operator panel 114 is stored in the designated character string storage device 510.

The HTML information analyzing unit 509 cuts out a title character string from an HTML file acquired according to the information acquisition program 503-1. The comparing means 511 compares the title character string cut out by the HTML information analyzing unit 509 with a character string stored in the designated character string storage device 510. The comparing means 511 then transfers the result of the comparison (agreement or disagreement) to the control unit 503.

The other components, that is, antenna 101, wireless device 102, first driver 104, first display device 105, second driver 106, second display device 107, memory 108, open/close detecting unit 112, notifying means 113, and operator panel 114 are identical to those shown in FIG. 2. The description of the components will therefore be omitted.

Figure 6:
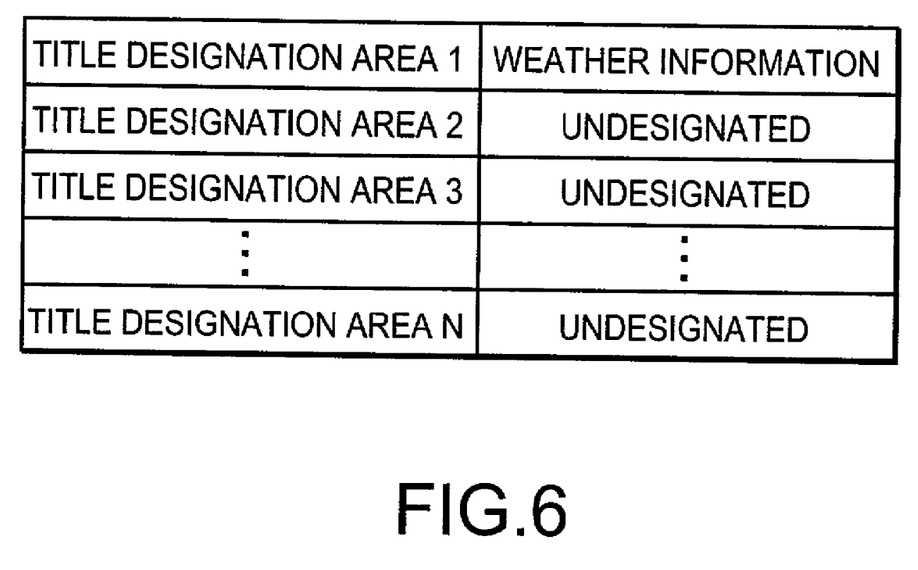
FIG. 6 shows an example of the structure of a designated character string storage device 510 shown in FIG. 5.

FIG. 6 shows an example of the structure of the designated character string storage device 510 shown in FIG. 5. Referring to FIG. 6, a character string written by the right-hand side of title designation area n (where n denotes 1 to N that is a positive integer) expresses stored data. Data to be recorded in the title designation area is a character string the user enters in advance by maneuvering the operator panel 114, and is equivalent to a title character string. Up to N character strings can be stored in the designated character string storage device 110. If no character string is recorded in a certain title designation area, information indicating the absence of a character string is recorded.

The user uses the operator panel 114 to enter a character string equivalent to a title character string of an HTML file whose contents the user wants to be displayed on the second display device 107 when the terminal device downloads the HTML file. The character string is processed by the control unit 503 and then stored in the designated character string storage device 510.

Figure 7:
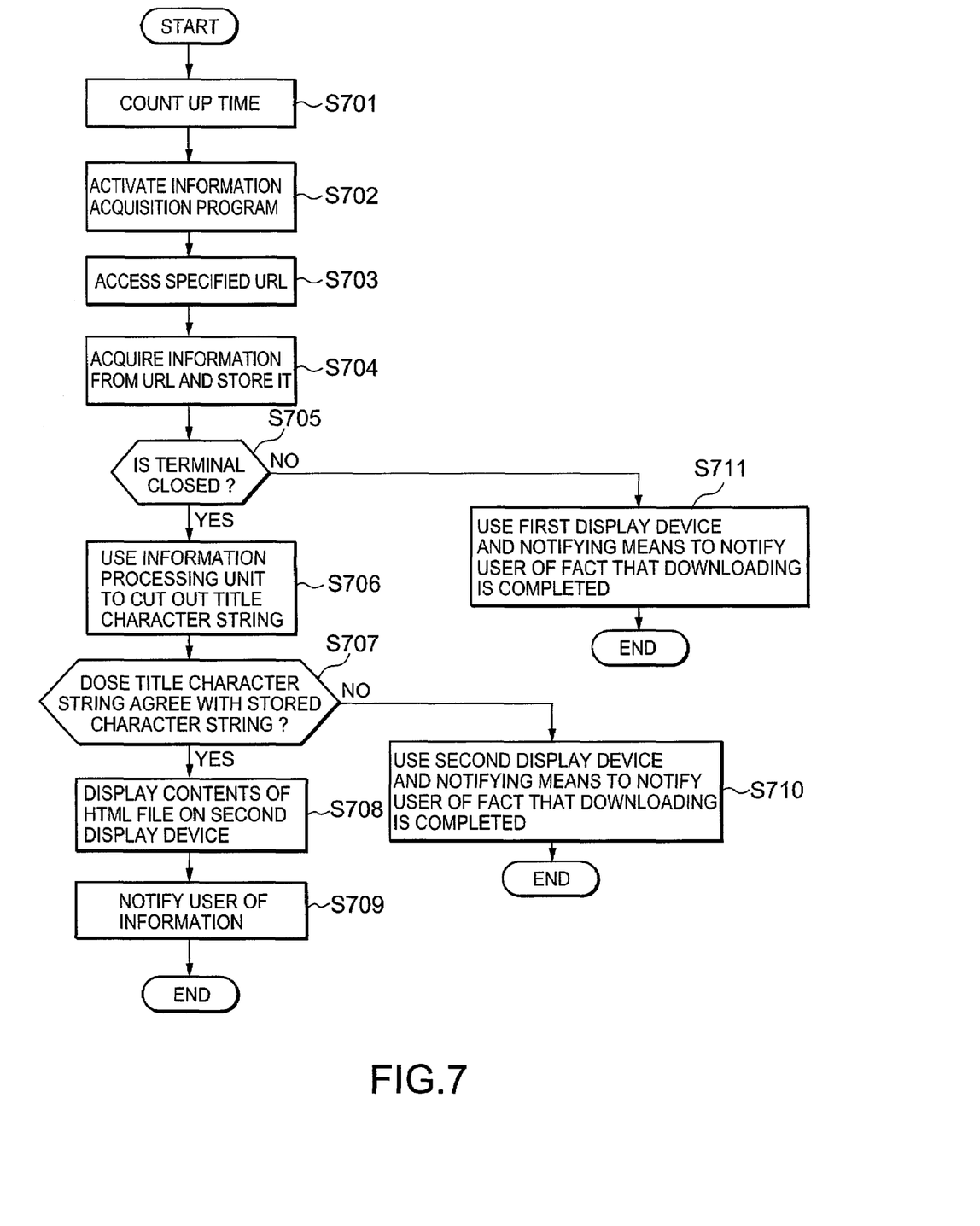
FIG. 7 is a flowchart describing actions to be performed by the portable terminal device shown in FIG. 5.

Next, the actions of the portable terminal device in accordance with the second embodiment of the present invention will be described in conjunction with the drawings. FIG. 7 is a flowchart describing the actions of the portable terminal device shown in FIG. 5.

Referring to FIG. 7, the timer means 515 notifies the control unit 503 of the fact that the timer means has counted up a predefined time (S701). The information acquisition program 503-1 is then activated (S702). The information distribution server is accessed while being located with the URL specified in advance in the information acquisition program 503-1 (S703). An HTML file stored in the information distribution server is then downloaded and stored in the memory 108 (S704).

The control unit 503 judges from the result of detection provided by the open/close detecting unit 112 whether the terminal is closed or open (S705). If the terminal is closed (the judgment of S705 is made in the affirmative), the HTML information analyzing unit 509 analyzes the acquired HTML file and cuts out a title character string enclosed with title tags (S706).

The control unit 503 receives the cut out title character string from the HTML information analyzing unit 509. The comparing means 511 then compares the title character string of the downloaded HTML file successively with the character strings recorded in the title designation areas 1 to N in the designated character string storage device 510 (S707).

If the title character string agrees with any character string recorded in a certain title designation area (the judgment of S707 is made in the affirmative), at least the character string enclosed with the body tags and contained in the HTML file is displayed on the second display device 107 as the contents of the HTML file (S708). At S708, in addition to the character string enclosed with the body tags and contained in the HTML file, the title character string may be displayed on the second display device 107.

Concurrently with the display of the character string on the second display device 107, the notifying means 113 gives a download completion notifying sound which signifies that the HTML file has been downloaded (S709).

If it is judged at S705 that the terminal is open, a presentation signifying that the HTML file has been downloaded is displayed on the first display device 105. In addition, the notifying means 113 gives the download completion notifying sound (S711).

If it is judged at S707 that a character string agreeing with the title character string is not stored in the designated character string storage device 510, a presentation signifying that the HTML file has been downloaded is displayed on the second display device 107 because the terminal is closed. Moreover, the notifying means 113 gives the download completion notifying sound (S710).

As mentioned above, in the portable terminal device according to the second embodiment of the present invention, even when not only mail message data but also an HTML file is acquired automatically with the folding terminal closed, only designated information the user wants to read can be displayed on the second display device 107. At this time, the user need not perform a special maneuver of opening the terminal so that the acquire HTML file can be displayed.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A portable terminal device, comprising:
   first storing means for storing a first information set for filtering received message information;
   receiving means for receiving data designated to said portable terminal device, said data comprising message information and a second information set;
   second storing means for storing said received message information and said received second information set in a case that said received data is designated to said portable terminal device;
   displaying means for displaying said received message information;
   detecting means for detecting whether or not said portable terminal device is closed;
   comparing means for comparing said first information set with said second information set; and
   controlling means for controlling said display means to selectively display said received message information based on said detecting means and said comparing means, wherein said display means displays said received message information in a case that said portable terminal device is closed and said first information set matches said second information set.

2. The portable terminal device as claimed in claim 1, wherein said displaying means is provided at a position visible to the user with said portable terminal device closed.

3. The portable terminal device as claimed in claim 1, wherein said controlling means controls said displaying means to display information showing the arrival of said data when said first information set does not match said second information set.

4. The portable terminal device as claimed in claim 3, wherein said second information set comprises at least one of a title and sender information associated with said data.

5. The portable terminal device as claimed in claim 1, wherein said first storing means stores a third information set, the received data further comprises a fourth information set, and said comparing means compares said third information set with said fourth information set.

6. The portable terminal device as claimed in claim 1, wherein said controlling means controls the received message information to be displayed and to not be displayed based on the results of said detecting means and said comparing means.

7. The portable terminal device as claimed in claim 1, wherein said displaying means displays said received message information in a case that said second information set is determined to be included in said first information set, and said displaying means displays a predetermined message in a case that said second information set is determined to not be included in said first information set.

8. The portable terminal device as claimed in claim 1, wherein said received data designated to said portable terminal device, which is received by said portable terminal device, is filtered such that message information of data having a second information set which does not match said first information set is not displayed when said portable terminal device is closed.

9. A portable terminal device, comprising:
   a first housing;
   a second housing connected with a hinge to each other;
   first storing means for storing a first information set for filtering received message information and a second information set for filtering received message information;
   receiving means for receiving data designated to said portable terminal device, said data comprising title information, sender information and message information;
   second storing means for storing said received message information and said received second information set in a case that said received data is designated to said portable terminal device;
   first displaying means provided at a position invisible to the user with said portable terminal device closed;
   second displaying means provided at a position visible to the user with said portable terminal device closed;
   detecting means for detecting whether or not said portable terminal device is closed;
   first comparing means for comparing said first information with said title information;
   second comparing means for comparing said second information with said sender information; and
   controlling means for controlling said second display means to selectively display said received message information based on said detecting means and at least one of said first comparing means and second comparing means, wherein said second display means displays said received message information in a case that said portable terminal device is closed and at least one of said first information set and said second information set matches said title information or said sender information.

10. The portable terminal device as claimed in claim 9, wherein said second display means displays said message information when said first information set matches said title information, and a message showing the arrival of said data when said first information set does not match said title information.

11. The portable terminal device as claimed in claim 9, wherein said second display means displays said message information when said second information set matches said sender information, and a message showing the arrival of said data when said second information set does not match said sender information.

12. The portable terminal device as claimed in claim 9, wherein said data is an electronic mail message.

13. The portable terminal device as claimed in claim 9, wherein said controlling means controls said displaying means to display or not to display the message information based on the results of said detecting means and said comparing means.

14. The portable terminal device as claimed in claim 9, wherein when said portable terminal device is detected to be closed, said second displaying means displays said message information in a case that said first information is determined to be included in said title information or said second information is determined to be included in said sender information, and said second displaying means displays a predetermined message in a case that said first information is determined to not be included in said title information and said second information is determined to not be included in said sender information.

15. The portable terminal device as claimed in claim 9, wherein said received data designated to said portable terminal device, which is received by said portable terminal device, is filtered such that message information of data having a second information set which does not match said first information set is not displayed on said second display means when said portable terminal device is closed.

16. A portable terminal device, comprising:
first storing means for storing a first information set for filtering received message information;
counting means for counting a predetermined time;
outputting means for outputting a signal when said counting means counts up to said predetermined time;
connecting means for connecting to a predetermined server in response to said signal;
receiving means for receiving data designated to said portable terminal device, said data including message information and a second information set from said predetermined server;
second storing means for storing said received message information and said received second information set in a case that said received data is designated to said portable terminal device;
displaying means for displaying said received message information;
detecting means for detecting whether or not said portable terminal device is closed;
comparing means for comparing said first information with said second information; and
controlling means for controlling said display means to selectively display said received message information based on said detecting means and said comparing means, wherein said display means displays said received message information in a case that said portable terminal device is closed and said first information set matches said second information set.

17. The portable terminal device as claimed in claim 16, wherein said displaying means is provided at a position visible to the user with said portable terminal device closed.

18. The portable terminal device as claimed in claim 16, wherein said controlling means controls said displaying means to display information showing the arrival of said data when said first information set does not match said second information.

19. The portable terminal device as claimed in claim 18, wherein said second information set comprises a title name of said data.

20. The portable terminal device as claimed in claim 16, wherein said data is an HTML file, and said predetermined server is an information distribution server.

21. The portable terminal device as claimed in claim 16, wherein said controlling means controls said second information set to be displayed and to not be displayed based on the results of said detecting means and said comparing means.

22. The portable terminal device as claimed in claim 16, wherein when said portable terminal device is detected to be closed, said displaying means displays said received message information in a case that said second information set is determined to be included in said first information set, and said displaying means displays a predetermined message in a case that said second information set is determined to not be included in said first information set.

23. The portable terminal device as claimed in claim 16, wherein said received data designated to said portable terminal device, which is received by said portable terminal device, is filtered such that message information of data having a second information set which does not match said first information set is not displayed when said portable terminal device is closed.

24. A portable terminal device, comprising:
a first memory that stores a first information set for filtering received message information;
a receiver that receives data designated to said portable terminal device, said data comprising message information and a second information set;
a second memory that stores said received message information and said received second information set in a case that said received data is designated to said portable terminal device;
a display that displays said received message information;
a detector that detects whether or not said portable terminal device is closed;
a comparator that compares said first information set with said second information set; and
a controller that controls said display to selectively display said received message information based on said detector and at least one of said first comparing means and second comparing means, wherein said display means displays said received message information in a case that said portable terminal device is closed and at least one of said first information set and said second information set matches said title information or said sender information.

25. The portable terminal device as claimed in claim 24, wherein said display is provided at a position visible to the user with said portable terminal device closed.

26. The portable terminal device as claimed in claim 24, wherein said controller controls said display to display information showing the arrival of said data when said first information set does not match said second information set.

27. The portable terminal device as claimed in claim 26, wherein said second information set comprises at least one of a title and sender information associated with said data.

28. The portable terminal device as claimed in claim 24, wherein said first memory stores a third information set, the received data further comprises a fourth information set, and said comparator compares said third information set with said fourth information set.

29. The portable terminal device as claimed in claim 24, wherein said controller controls the received message information to be displayed and to not be displayed based on the results of said detector and said comparator.

30. The portable terminal device as claimed in claim 24, wherein when said portable terminal device is detected to be closed, said display displays said received message information in a case that said second information set is determined to be included in said first information set, and said display displays a predetermined message in a case that said second information set is determined to not be included in said first information set.

31. The portable terminal device as claimed in claim 24, wherein said received data designated to said portable terminal device, which is received by said portable terminal device, is filtered such that message information of data having a second information set which does not match said first information set is not displayed when said portable terminal device is closed.

32. A portable terminal device, comprising:
a first memory that stores a first information set for filtering received message information and a second information set for filtering received message information;
a receiver that receives data designated to said portable terminal device, said data comprising title information, sender information and message information;
a second memory that stores said received message information and said received second information set in a case that said received data is designated to said portable terminal device;
a first display provided at a position invisible to the user with said portable terminal device closed;
a second display provided at a position visible to the user with said portable terminal device closed;
a detector that detects whether or not said portable terminal device is closed;
a first comparator that compares said first information set with said title information; a second comparator that compares said second information set with said sender information;
a controller that controls said second display to selectively display said received message information based on said detector and at least one of said first comparator and second comparator, wherein said second display displays said received message information in a case that said portable terminal device is closed and at least one of said first information set and said second information set matches said title information or said sender information.

33. The portable terminal device as claimed in claim 32, wherein said second display displays said message information when said first information set matches said title information, and a message showing the arrival of said data when said first information set does not match said title information.

34. The portable terminal device as claimed in claim 32, wherein said second display displays said message information when said second information set matches said sender information, and a message showing the arrival of said data when said second information set does not match said sender information.

35. The portable terminal device as claimed in claim 32, wherein said data is an electronic mail message.

36. The portable terminal device as claimed in claim 32, wherein said controller controls the message information to be displayed and to not be displayed based on the results of said detector and at least one of said first comparator and second comparator.

37. The portable terminal device as claimed in claim 32, wherein when said portable terminal device is detected to be closed, said second display displays said message information in a case that said first information set is determined to be included in said title information or said second information set is determined to be included in said sender information, and said second display displays a predetermined message in a case that said first information set is determined to not be included in said title information and said second information set is determined to not be included in said sender information.

38. The portable terminal device as claimed in claim 32, wherein said received data designated to said portable terminal device, which is received by said portable terminal device, is filtered such that message information of data having a second information set which does not match said first information set is not displayed on said second display means when said portable terminal device is closed.

39. A portable terminal device, comprising:
a first memory that stores a first information set for filtering received message information;
a timer that counts to a predetermined time;
an outputting circuit that outputs a signal when said timer reaches said predetermined time;
a connector that connects to a predetermined server in response to said signal;
a receiver that receives data designated to said portable terminal device, said data including a message information and a second information set from said predetermined server;
a second memory that stores said received message information and said received second information set in a case that said received data is designated to said portable terminal device;
a display that displays said received message information;
a detector that detects whether or not said portable terminal device is closed;
a comparator that compares said first information set with said second information set; and
a controller that controls said display to selectively display said received message information based on said detector and said comparator, wherein said display displays said received message information in a case that said portable terminal device is closed and said first information set matches said second information set.

40. The portable terminal device as claimed in claim 39, wherein said display is provided at a position visible to the user with said portable terminal device closed.

41. The portable terminal device as claimed in claim 39, wherein said controller controls said display to display information showing the arrival of said data when said first information set does not match said second information.

42. The portable terminal device as claimed in claim 41, wherein said second information set comprises a title name of said data.

43. The portable terminal device as claimed in claim 39, wherein said data is an HTML file, and said predetermined server is an information distribution server.

44. The portable terminal device as claimed in claim 39, wherein said controller controls said second information set to be displayed and to not be displayed based on the results of said detector and said comparator.

45. The portable terminal device as claimed in claim 39, wherein when said portable terminal device is detected to be closed, said display displays said received message information in a case that said second information set is determined to be included in said first information set, and said display displays a predetermined message in a case that said second information set is determined to not be included in said first information set.

46. The portable terminal device as claimed in claim 39, wherein said received data designated to said portable terminal device, which is received by said portable terminal device, is filtered such that message information of data having a second information set which does not match said first information set is not displayed when said portable terminal device is closed.

47. A method for controlling display of messages in a portable terminal device, said method comprising:
   storing a first information set for filtering received message information;
   receiving data designated to said portable terminal device, said data including message information and a second information set;
   storing said received message information and said received second information set in a case that said received data is designated to said portable terminal device;
   detecting whether or not said terminal device is closed;
   comparing said first information set with said second information set;
   judging whether or not said received message information, is displayed on a first display provided at a position visible to the user with said portable terminal device closed on the basis of the results of said detecting and said comparing;
   displaying said received message information in a case that said portable terminal device is closed and said first information set matches said second information set.

48. The method for controlling display of messages in said terminal device as claimed in claim 47, further comprising displaying information showing the arrival of said data on second display provided at a position invisible to the user with said terminal device closed, if said terminal device is opened.

49. The method for controlling display of messages in said terminal device as claimed in claim 48, wherein said second information set comprises at least one of a title and sender information associated with said data.

50. The method for controlling display of messages in said terminal device as claimed in claim 47, wherein said data is an electronic mail message.

51. The method for controlling display of messages in said terminal device as claimed in claim 47, further comprising:
   storing a third information set; and
   comparing said third information set with a fourth information set, the for the information set being included in the received data.

52. The method for controlling display of messages in said terminal device as claimed in claim 47, wherein said first display does not display the received message information when said terminal device is not closed or said first information set does not match said second information set.

53. The method as claimed in claim 47, wherein when said portable terminal device is detected to be closed, said received message information is displayed on said first display in a case that said second information set is determined to be included in said first information set, and a predetermined message is displayed on said first display in a case that said second information set is determined to not be included in said first information set.

54. The method as claimed in claim 47, wherein said received data designated to said portable terminal device, which is received by said portable terminal device, is filtered such that message information of data having a second information set which does not match said first information set is not displayed when said portable terminal device is closed.

55. A method for controlling display of messages in a portable terminal device, comprising:
   storing a first information set for filtering received massage information;
   counting to a predetermined time;
   outputting a signal when said predetermined time is counted up;
   connecting to a predetermined server in response to said signal;
   receiving data designated to said portable terminal device, said data including message information and a second information set from said predetermined server;
   storing said received message information and said received second information set in a case that said received data is designated to said portable terminal device;
   detecting whether or not said terminal device is closed;
   comparing said first information set with said second information set; and
   judging whether or not said received message information is displayed on a first display provided at a position visible to the user with said portable terminal device closed on the basis of the results of said detecting and said comparing;
   displaying said received message information in a case that said portable terminal device is closed and said first information set matches said second information set.

56. The method for controlling display of messages in said terminal device as claimed in claim 55, further comprising displaying information showing the arrival of said data on second display provided at a position invisible to the user with said terminal device closed, if said terminal device is opened.

57. The method for controlling display of messages in said terminal device as claimed in claim 56, wherein said second information set comprises a title name of said data.

58. The method for controlling display of messages in said terminal device as claimed in claim 55, wherein said data is an HTML file, and said predetermined server is an information distribution server.

59. The method for controlling display of messages in said terminal device as claimed in claim 55, wherein said first display does not display the received message information when said terminal device is not closed or said first information set does not match said second information set.

60. The method as claimed in claim 55, wherein when said portable terminal device is detected to be closed, said received message information is displayed in a case that said second information set is determined to be included in said first information set, and a predetermined message is displayed in a case that said second information set is determined to not be included in said first information set.

61. The method as claimed in claim 55, wherein said received data designated to said portable terminal device, which is received by said portable terminal device, is filtered such that message information of data having a second information set which does not match said first information set is not displayed when said portable terminal device is closed.

62. A program for instructing a computer to implement a displaying method for a portable terminal device, said program comprising software instructions stored on a computer-readable medium, said software instructions comprising:

storing a first information set for filtering received message information;

receiving data designated to said portable terminal device, said data including message information and a second information set;

storing said received message information and said received second information set in a case that said received data is designated to said portable terminal device;

detecting whether or not said terminal device is closed;

comparing said first information set with said second information set;

judging whether or not said received message information is displayed on a first display provided at a position visible to the user with said portable terminal device closed on the basis of the results of said detecting and said comparing;

displaying said received message information in a case that said portable terminal device is closed and said first information set matches said second information set.

63. The program as claimed in claim 62, said software instructions further comprising:

storing a third information set; and comparing said third information set with a fourth information set, the for the information set being included in the received data.

64. The program as claimed in claim 62, wherein said first display does not display the received message information when said terminal device is not closed or said first information set does not match said second information set.

65. The program as claimed in claim 62, wherein when said portable terminal device is detected to be closed, said received message information is displayed on said first display in a case that said second information set is determined to be included in said first information set, and a predetermined message is displayed on said first display in a case that said second information set is determined to not be included in said first information set.

66. The program as claimed in claim 62, wherein said received data designated to said portable terminal device, which is received by said portable terminal device, is filtered such that message information of data having a second information set which does not match said first information set is not displayed when said portable terminal device is closed.

67. A program for instructing a computer to implement a displaying method for a portable terminal device, said program comprising software instructions stored on a computer-readable medium, said software instructions comprising:

storing a first information set for filtering received message information;

counting to a predetermined time;

outputting a signal when said predetermined time is reached;

connecting to a predetermined server in response to said signal;

receiving data including message information and a second information set from said predetermined server;

storing said received message information and said received second information set in a case that said received data is designated to said portable terminal device;

detecting whether or not said terminal device is closed;

comparing said first information set with said second information set; and judging whether or not said received message information is displayed on a first display provided at a position visible to the user with said portable terminal device closed on the basis of the results of said detecting and said comparing;

displaying said received message information in a case that said portable terminal device is closed and said first information set matches said second information set.

68. The program as claimed in claim 67, wherein said first display does not display the received message information when said terminal device is not closed or said first information set does not match said second information set.

69. The program as claimed in claim 67, wherein when said portable terminal device is detected to be closed, said received message information is displayed on said first display in a case that said second information set is determined to be included in said first information set, and a predetermined message is displayed on said first display in a case that said second information set is determined to not be included in said first information set.

70. The program as claimed in claim 67, wherein said received data designated to said portable terminal device, which is received by said portable terminal device, is filtered such that message information of data having a second information set which does not match said first information set is not displayed when said portable terminal device is closed.

* * * * *

UNITED STATES PATENT AND TRADEMARK OFFICE
CERTIFICATE OF CORRECTION

PATENT NO. : 7,203,531 B2  
APPLICATION NO. : 10/145888  
DATED : April 10, 2007  
INVENTOR(S) : Toru Kido

Page 1 of 1

It is certified that error appears in the above-identified patent and that said Letters Patent is hereby corrected as shown below:

Column 18, Line 1  
Delete "display" and insert -- displaying means --

Signed and Sealed this

Thirtieth Day of September, 2008

JON W. DUDAS  
*Director of the United States Patent and Trademark Office*